Patented Nov. 18, 1952

2,618,654

UNITED STATES PATENT OFFICE 2,618,654

PREPARATION OF 4-HALOGENO-2-BUTENOIC ACIDS

Elbert C. Ladd, Passaic, N. J., assignor to United States Rubber Company, New York, N. Y., a corporation of New Jersey No Drawing. Application November 1, 1950, Serial No. 193,535

5 Claims. (Cl. 260—539)

This invention relates to a method of preparing 4-halogeno-2-butenoic acids, $$X-CH_2-C(R)=CH-COOH$$

wherein X is chlorine or bromine, and R is H or methyl, by effecting hydrolysis and partial dehydrohalogenation of a compound of the formula $X-CH_2-CY(R)-CH_2-CY_3$, wherein X and R are as before and each Y is chlorine or bromine, by the action of concentrated sulfuric acid and then of water. Still more particularly, it relates to a method of making such acids by reacting a tetrahalogenomethane, $CY_4$, wherein each Y is chlorine or bromine, with a 2-alkenyl halide in the presence of a free radical reaction initiator to form an adduct of the formula $$X-CH_2-CY(R)-CH_2-CY_3$$

and subsequently treating this adduct to effect the aforementioned hydrolysis and partial dehydrohalogenation.

The reactions involved in carrying out my novel method for preparing the defined 2-butenoic acids may be represented as follows (each Y being Cl or Br):

(1) 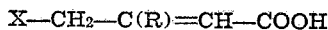
$$X-CH_2-C(R)=CH_2 + CY_4 \xrightarrow{\text{free radicals}} X-CH_2-CY(R)-CH_2-CY_3$$

(2) 
$$X-CH_2-CY(R)-CH_2-CY_3 \xrightarrow{H_2SO_4}$$

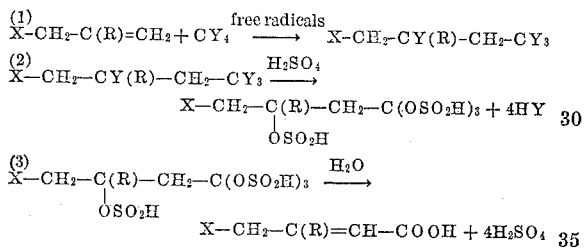
$$X-CH_2-C(R)-CH_2-C(OSO_2H)_3 + 4HY$$
$$\underset{OSO_2H}{|}$$

(3)
$$X-CH_2-C(R)-CH_2-C(OSO_2H)_3 \xrightarrow{H_2O}$$
$$\underset{OSO_2H}{|}$$

$$X-CH_2-C(R)=CH-COOH + 4H_2SO_4$$

The first step in the method of my invention, as illustrated in (1) above, is carried out by heating a 2-alkenyl halide $CH_2=C(R)-CH_2-Y$, as defined above, with from 1 to 20 molar equivalents of the tetrahalogenomethane, $CY_4$, at 25°–120° C. in the presence of a generator of free radicals, such as ultra-violet light or 0.1–20.0% by weight of a peroxide, e. g., an organic peroxide such as acetyl peroxide, benzoyl peroxide, cumene hydrogen peroxide, or tertiary-butyl hydrogen peroxide, for a time sufficient to effect an adequate degree of reaction, such times being generally in the range of from 0.2 to 100 hours, usually from 1 to 50 hours.

The next step in my invention, illustrated in (2) above, is usually carried out by heating the addition product of the 2-alkenyl halide and the tetrahalogenomethane with from 0.5 to 20 molar equivalents, preferably 0.5 to 5.0 molar equivalents, of concentrated (at least 90%) sulfuric acid (e. g., of sp. gr. 1:84) at 25°–120° C., and preferably from 80° to 120° C. and for reaction times in the range of from 0.1 to 24 hours. Hydrogen halide is evolved during reaction (2). The hydrolysis is completed by pouring the reaction mixture into cold water, preferably ice water, to effect reaction (3). The weight of water used in this step should be at least twice that of the reaction mixture. Preferably the temperature of the water used does not exceed 2° C. Preferably the temperature of the reaction mixture and the relative proportions of reaction mixture and of cold water are so adjusted that the temperature of the resulting mixture immediately after the commingling step does not exceed 10° C. The commingling step is carried out in such manner that intimate intermixture of the reaction mixture and the water is obtained. The reaction product, in impure form, separates as an oily layer which can be separately drawn off.

The reaction product is isolated from the resulting mixture by the conventional techniques or organic chemistry, including extraction, distillation and crystallization.

The 4-halogeno-2-butenoic acids obtained by the method of my invention are useful in the fields of polymerization, pharmaceuticals and agricultural chemicals as well as in the synthesis of other chemicals.

The following examples disclose the invention in more detail. All parts are by weight.

Example 1

An adduct of allyl chloride and bromotrichloromethane is first prepared, as follows. A mixture of 57.3 parts of allyl chloride, 594.9 parts of bromotrichloromethane and 6.0 parts of benzoyl peroxide is heated at reflux for approximately 0.25 hour. The reaction mixture is then cooled and 57.3 parts of allyl chloride and 6.0 parts of benzoyl peroxide are added. After refluxing for 0.25 hour, an additional 57.3 parts of allyl chloride and 6.0 parts of benzoyl peroxide are added and the reaction mixture is refluxed for 0.45 hour. After cooling, the reaction mixture is washed with dilute aqueous sodium bicarbonate solution, dried, and fractionally distilled to yield 502 parts of the adduct 1,1,1,4-tetrachloro-3-bromobutane, B. 73.5–74° C./3 mm.; $n_D^{20}$ 1.5320, sp. g. (20°/20°) 1.7934; total halogen as chlorine: found, 64.46% (theory, 64.52%).

Fifty-five parts of the resulting adduct are mixed with 138 parts of concentrated sulfuric acid (sp. g. 1.84) and heated for 2.5 hours, the initial temperature of 90° C. being gradually raised to 115° C. After cooling, the reaction mixture is poured into an excess of ice water and the oil which separates is extracted with 2 volumes of 80:20 mixture of diethyl ether and n-hexane. The dried extract is evaporated and the residue is fractionally distilled to yield 12 parts of the known compound trans-4-chloro-2-butenoic acid, B. ca. 90–95°/1 mm. Upon recrystallization from a mixture of diisopropyl ether and n-hexane the acid melts at 81–81.5° C. (uncorr.).

*Example 2*

An adduct of allyl chloride and carbon tetrachloride is first prepared, as follows: A mixture of 50 parts of allyl chloride, 1540 parts of carbon tetrachloride and 0.97 part of benzoyl peroxide is heated at 70° C. for 48 hours. The reaction mixture is then fractionally distilled to yield 32 parts of 1,1,1,3,4-pentachlorobutane, B. 34.0–41.2° C./0.3–0.5 mm.; $n_D^{20}$ 1.5100; chlorine content: found, 76.6% (theory, 76.8%).

The adduct is converted to 4-chloro-2-butenoic acid by treatment with concentrated sulfuric acid and then with water as in Example 1 above.

*Example 3*

An adduct of methallyl chloride and bromotrichloromethane is first prepared, as follows: A mixture of 91 parts of 2-methylallyl chloride, 99.5 parts of bromotrichloromethane and 1.0 part of benzoyl peroxide is heated at reflux for 0.5 hour after which the mixture is cooled to 25° C. and 9.1 parts of methallyl chloride and 1.0 part of benzoyl peroxide are added. The reaction mixture is then refluxed for 0.75 hour, cooled, washed successively with dilute aqueous sodium bicarbonate and water and dried. Fractional distillation yields 28.8 parts of 3-bromo-1,1,1,4-tetrachloro-3-methylbutane, B. 65–66° C./0.50–0.75 mm.; $n_D^{20}$ 1.5326; total halogen as chlorine: found, 60.07% (theory, 61.38%).

Upon treatment with concentrated sulfuric acid (sp. g. 1.84) and then with water as in preceding examples, the adduct is converted to 4-chloro-3-methyl-2-butenoic acid.

In a similar manner the corresponding 4-bromo-2-butenoic acids are prepared by starting with the 2-alkenyl bromide instead of the chloride, and carrying out the same steps as described.

The 4-chloro and the 4-bromo-2-butenoic acids can be employed in the production of vitamin A and related compounds, by known reactions.

Having thus described my invention, what I claim and desire to protect by Letters Patent is:

1. A method of making a compound of the type X—CH₂—C(R)=CH—COOH where X is selected from the class consisting of chlorine and bromine, and R is selected from the class consisting of hydrogen and methyl, which comprises effecting hydrolysis and partial dehydrohalogenation of a compound of the type

X—CH₂—CY(R)—CH₂—CY₃ wherein R and X are as before and Y is selected from the class consisting of chlorine and bromine, by heating the compound with concentrated sulfuric acid and thereafter reacting the resulting acid mixture with water.

2. A method of making a compound of the type X—CH₂—C(R)=CH—COOH where X is selected from the class consisting of chlorine and bromine, and R is selected from the class consisting of H and methyl, which comprises effecting hydrolysis and partial dehydrohalogenation of a compound of the type

X—CH₂—CY(R)—CH₂—CY₃ wherein R and X are as before and Y is selected from the class consisting of chlorine and bromine, by heating the compound with concentrated sulfuric acid at a temperature of from 25° to 120° C., and thereafter pouring the acid mixture into an excess of ice water.

3. The process of making 4-chloro-2-butenoic acid which comprises heating 1,1,1,4-tetrachloro-3-bromobutane with concentrated sulfuric acid, commingling the reacted mixture with an excess of water, and recovering 4-chloro-2-butenoic acid from the resulting mixture.

4. The process of making 4-chloro-2-butenoic acid which comprises heating 1,1,1,3,4-pentachlorobutane with concentrated sulfuric acid, commingling the reacted mixture with an excess of water, and recovering 4-chloro-2-butenoic acid from the resulting mixture.

5. The process of making 4-chloro-3-methyl-2-butenoic acid which comprises heating 3-bromo-1,1,1,4-tetrachloro-3-methylbutane with concentrated sulfuric acid, commingling the reacted mixture with an excess of water, and recovering 4-chloro-3-methyl-2-butenoic acid from the resulting mixture.

ELBERT C. LADD.

REFERENCES CITED

The following references are of record in the file of this patent:

UNITED STATES PATENTS

| Number | Name | Date |
| --- | --- | --- |
| 2,398,430 | Joyce | Apr. 16, 1946 |
| 2,440,800 | Handford et al. | May 4, 1948 |

OTHER REFERENCES

Broche et al.: Chem. Abstr., vol. 40, col. 4027 (1946).